US006056780A

United States Patent [19]

Aubry et al.

[11] Patent Number: 6,056,780

[45] Date of Patent: May 2, 2000

[54] METHOD FOR THE POSITIONING OF ELECTROMAGNETIC SENSORS OR TRANSMITTERS IN AN ARRAY

[75] Inventors: Claude Aubry, Grigny; Daniel Muller, Nanterre; Cédric Gegout, Vincennes; Gérard Marissal; Kim Khanh Pham, both of Bourg-la-Reine, all of France

[73] Assignee: Thomson-CSF, Paris, France

[21] Appl. No.: 08/934,082

[22] Filed: Sep. 19, 1997

[30] Foreign Application Priority Data

Sep. 20, 1996 [FR] France .................................. 96 11491

[51] Int. Cl.[7] .............................. H04B 17/00; G01S 3/16

[52] U.S. Cl. ............................. 703/2; 702/104; 342/379; 342/382; 706/24

[58] Field of Search ......................... 395/500.35, 500.23; 702/85, 87, 104; 706/22, 24; 342/379, 382, 145, 189, 378; 703/2

[56] References Cited

U.S. PATENT DOCUMENTS

| | | | |
|---|---|---|---|
| 5,687,286 | 11/1997 | Bar-Yam | 395/2.41 |
| 5,694,474 | 12/1997 | Ngo et al. | 381/66 |
| 5,774,690 | 6/1998 | O'Neill | 395/500 |
| 5,874,917 | 2/1999 | Desodt et al. | 342/379 |

OTHER PUBLICATIONS

Randy, L. Haupt, "An Introduction to Genetic Algorithms for Electromagnetics," IEEE Antennas & Propagation Magazine, vol. 37, No. 2, (Apr. 1, 1995), pp. 7–15.

Vittorio Murino, et al., "Synthesis of Unequally Spaced Arrays by Simulated Annealing," IEEE Transactions On Signal Processing, vol. 44, No. 1, (Jan. 1, 1996), pp. 119–123.

Randy L. Haupt, "Thinned Arrays Using Genetic Algorithms," IEEE Transactions On Antennas And Propagation, vol. 42, No. 7, (Jul. 1, 1994), pp. 993–999.

*Primary Examiner*—Kevin J. Teska
*Assistant Examiner*—Thai Phan
*Attorney, Agent, or Firm*—Oblon, Spivak, McClelland, Maier & Neustadt, P.C.

[57] ABSTRACT

A method for positioning plural electromagnetic sensors in an array including the steps of: (1) designating one of the two sensors of the plural sensors that are a greatest distance apart as a point of origin of a reference system, (2) encoding in genotype form, the coordinates of the sensors relative to the reference system, and (3) applying a genetic algorithm to the encoded genotypes to obtain a given phenotype associated with a desired pattern. The method can be applied to the optimization of antenna arrays, especially planar or linear arrays.

14 Claims, 4 Drawing Sheets

METHOD FOR THE POSITIONING OF ELECTROMAGNETIC SENSORS OR TRANSMITTERS IN AN ARRAY

BACKGROUND OF THE INVENTION

1. Field of the Invention

The present invention relates to a method for the positioning of electromagnetic sensors or transmitters in an array. It applies in particular to the optimization of plane or linear antenna arrays.

2. Discussion of the Background

An antenna is used to transmit and receive electromagnetic energy. In certain circumstances, a single antenna is enough to receive a signal that has undergone a little scrambling and that has been subjected to a few echoes. In this case, the radar is a parabolic reflector or a single dipole. However, radar applications are increasingly requiring high-gain antennas and the verification of a set of directional constraints. These constraints can be set for example by an antijamming operation using a fixed jammer. The constraints may also be variable, as in the case for example of the shifting of the main beam to obtain points of aim. One example of variable constraints relates for example to electronic scanning radars where the main beam moves electronically to sweep through a solid angle.

To satisfy these constraints, there is a known way of using antenna arrays. An antenna array is a graph whose nodes are elementary electromagnetic sensors. It enables the simultaneous processing of the signals coming from several angular directions. Unlike in the case of a single antenna with a limited frequency band and directivity, an antenna array has a modifiable pattern, in particular with the amplitude and/or phase weighting that is applied to each element. These weighting values can be combined to give preference to signals over possible interference, jamming and noise.

The synthesizing of a radar pattern includes in finding the weighting values that correspond to a set of given specifications. The synthesis of a pattern for an antenna array furthermore includes in finding an arrangement of the sensors by which the given constraints can be verified. In general, to meet these specifications, a curve that corresponds to an optimal pattern is defined, and it is sought to approach this curve, called a template, by varying the weighting values and the positions of the sensors.

The pattern thus does not depend only on the weighting values assigned to each element. It depends also on the frequency at which the array functions and on the positions of the elements of the antenna, especially the sensors. The problem that seems to be the most difficult and least resolved is how to search for the optimal geometry of an antenna given a series of constraints. This search must be guided by a desire to reduce the complexity of the array and its processing.

Uniformly distributed linear arrays have been designed, and there are known methods providing satisfactory solutions. However, the high cost of the elementary sensors has been a motivation behind the designing of non-uniform linear arrays, built either by the elimination of sensors from a uniform array, or by the pseudo-random positioning of sensors. In the latter case, obtaining the optimal pattern by varying the weighting values requires very high-level computations that greatly depend on the geometry, the frequency of reception and the desired template. In addition, more highly restrictive antijamming constraints and the advent of electronic scanning radars that have made it necessary to develop plane antenna arrays, are even further complicating the search for an optimal pattern.

The synthesis of an antenna array pattern thus includes finding an arrangement of the electromagnetic sensors and a configuration of the weighting values that provide for the verification of given constraints. In particular, it entails problems of optimization under constraints related to the positioning of the sensors in linear, plane or thinned arrays. The constraints may be highly varied. They may be, for example, limits on the number of sensors or constraints related to the electromagnetic coupling of the sensors. There are known methods of optimization that work on a continuous field and bring satisfactory solutions. However, the non-convexity and the non-continuity of certain constraints makes it difficult to implement them.

SUMMARY OF THE INVENTION

The present invention uses the approaches mentioned here above by formalizing the problem in the form of a problem of the continuous optimization of the positioning of the sensors in one or two dimensions. This new formalization raises difficult problems of encoding, namely configuration redundancy and non-minimal search space. An encoding of the parameters of the array has been devised, making it possible to carry out a search in a minimum space while taking into account every possible configuration.

The invention is aimed, in particular, at enabling a simple optimization for the positioning of sensors in an array which, moreover, is subjected to a very great variety of constraints.

To this end, the present invention is directed to a method of; positioning electromagnetic sensors or transmitters in an array, the method includes at least the steps of;

(1) taking one of the two sensors that are at the greatest distance from each other as the point of origin of a reference system, (2) obtaining a first vector of components according to;

$$\Delta_i = \frac{X_{i+1} - X_i}{D}$$

and obtaining a second vector (Vd) of components according to:

$$d_i = \frac{Y_{i+1} - Y_i}{D}$$

where:

i is the index associated with an i order sensor;

$x_i$, $y_i$ are the coordinates of the i order sensor respectively along the X-axis and the Y-axis of the reference system, $X_i + y_{i+1}$ are the coordinates of the i+1 order sensor, respectively along the X-axis and the Y-axis of the reference system, D is the distance between the two sensors that are at the greatest distance from each other, and (3) applying a genetic algorithm to the first and second vectors in order to obtain a given antenna pattern.

The main advantages of the invention are that it (1) can be adapted to all types of antenna arrays and all types of antenna patterns, (2) reduces the necessary computation times and capacities, (3) can be adapted to all types of algorithms known as genetic algorithms, and (4) is economical.

BRIEF DESCRIPTION OF THE DRAWINGS

Other characteristics and advantages of the invention shall appear from the following description made with reference to the appended drawings, of which.

DETAILED DESCRIPTION

Figure 1:
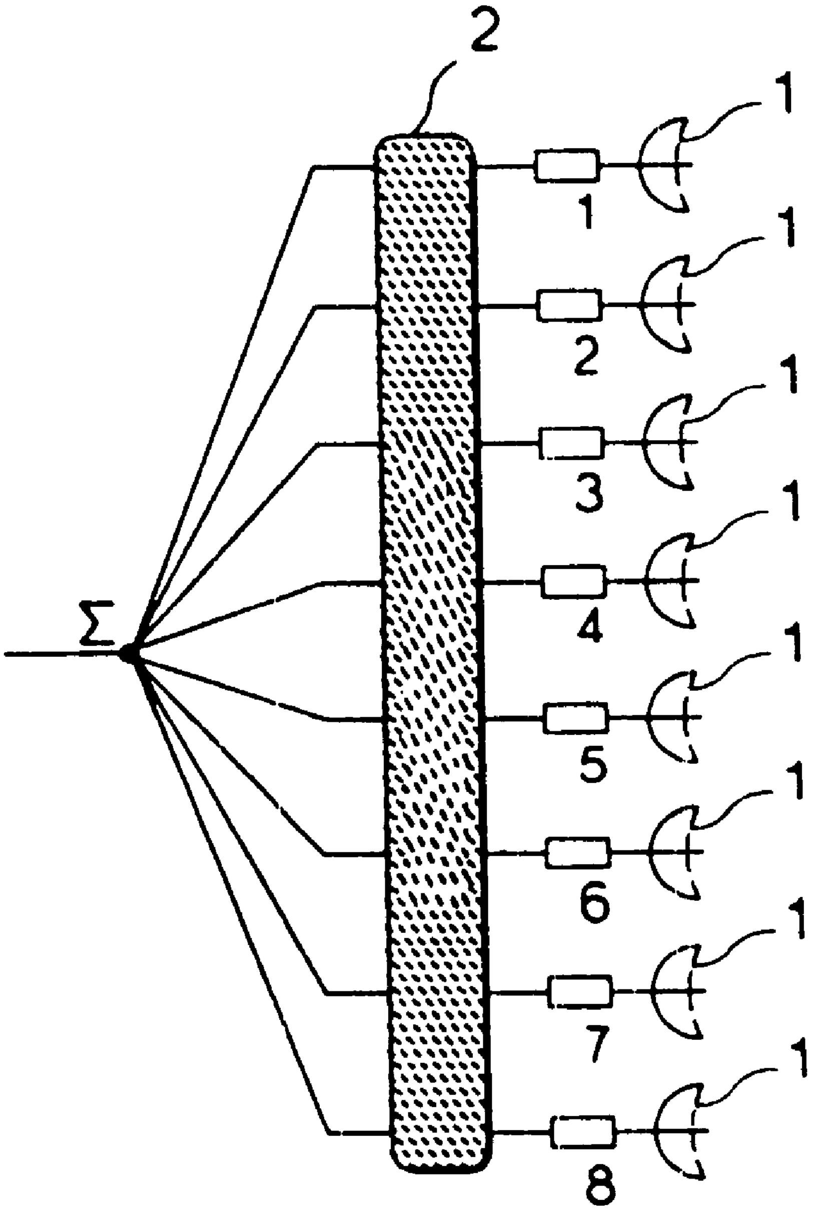
FIGS. 1 and 2 show an array of electromagnetic sensors.
Figure 2:
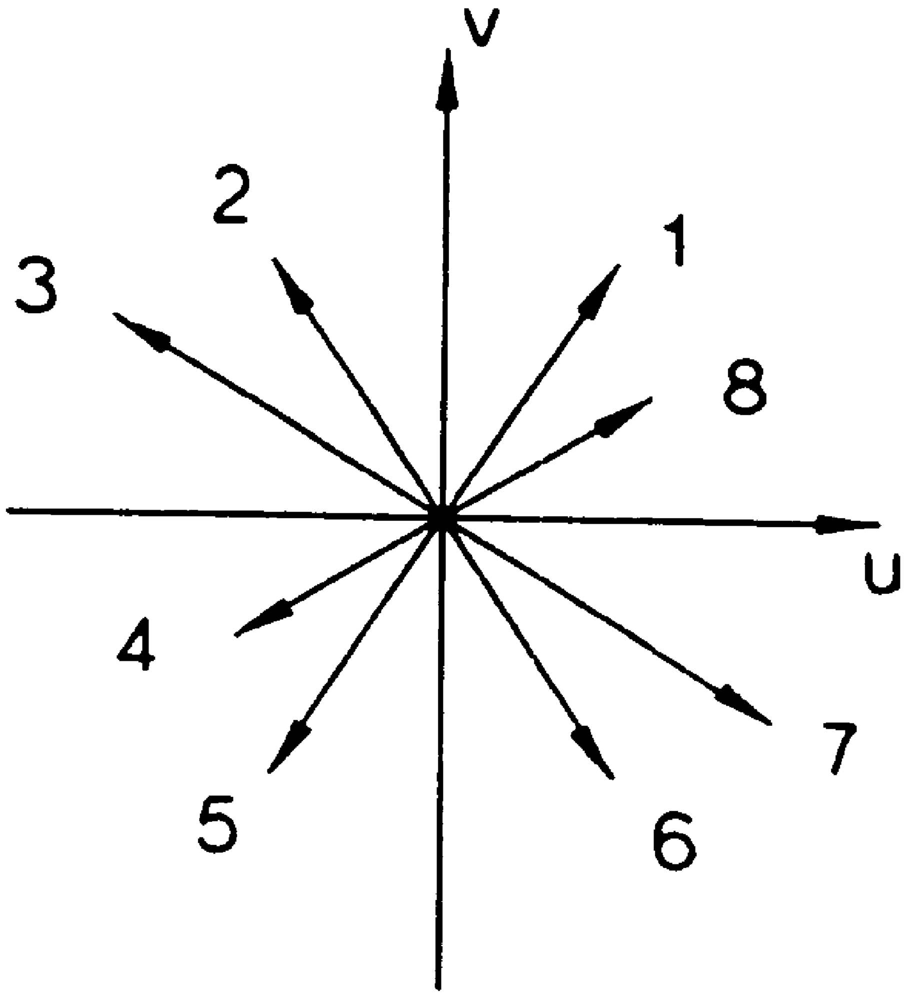

FIGS. 1 and 2 both provide an exemplary illustration of the same antenna array. This array has, for example, eight sensors 1. A number from 1 to 8 is allotted to each sensor. FIG. 1 is a profile view of the sensor array; while FIG. 2 shows the positions of the sensors in a plane relative to axes u, v. The positions of the sensors. are represented by the end of vectors each associated with sensor number. These vectors originate at the point of origin of the system of axes u, v. Weighting means 2 assign a weighting coefficient, for example to the signal received by each sensor 1. The received signals are, for example, then conveyed to the sum channel Σ of the reception system of a radar.

An antenna array is made up of a set of N elementary sensors receiving an electromagnetic signal. These sensors must be distributed on a plane or any other surface, for example a spherical surface, in order to obtain a pattern of reception that is as appropriate as possible, especially as a function of constraints related to applications. If we assume that an array comprises, for example 30 sensors, and if each sensor is referenced by two coordinates, then it is necessary to act on 60 parameters in order to position all the sensors. A comprehensive search through this set of parameters, by means of iterations for example, then becomes very complicated and, in particular, requires great computing capacity. To obtain a given antenna pattern, it is necessary, for example, to act also on associated weighting coefficients.

Figure 3:
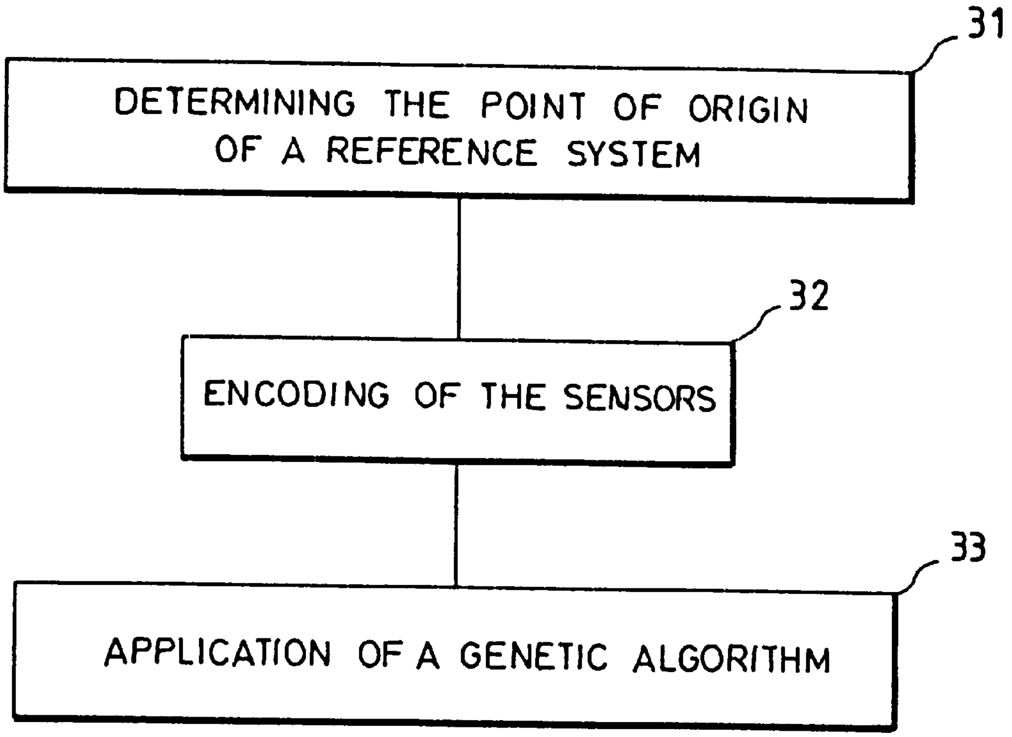
FIG. 3 illustrates a succession of possible steps in the method according to the invention.

FIG. 3 illustrates an exemplary sequence of steps for the implementation of the method according to the invention. In a first step 31, the point of origin of a reference is given. The point of origin of this reference is constituted by the position of one of the two sensors that are at the greatest distance from each other.

Figure 4:
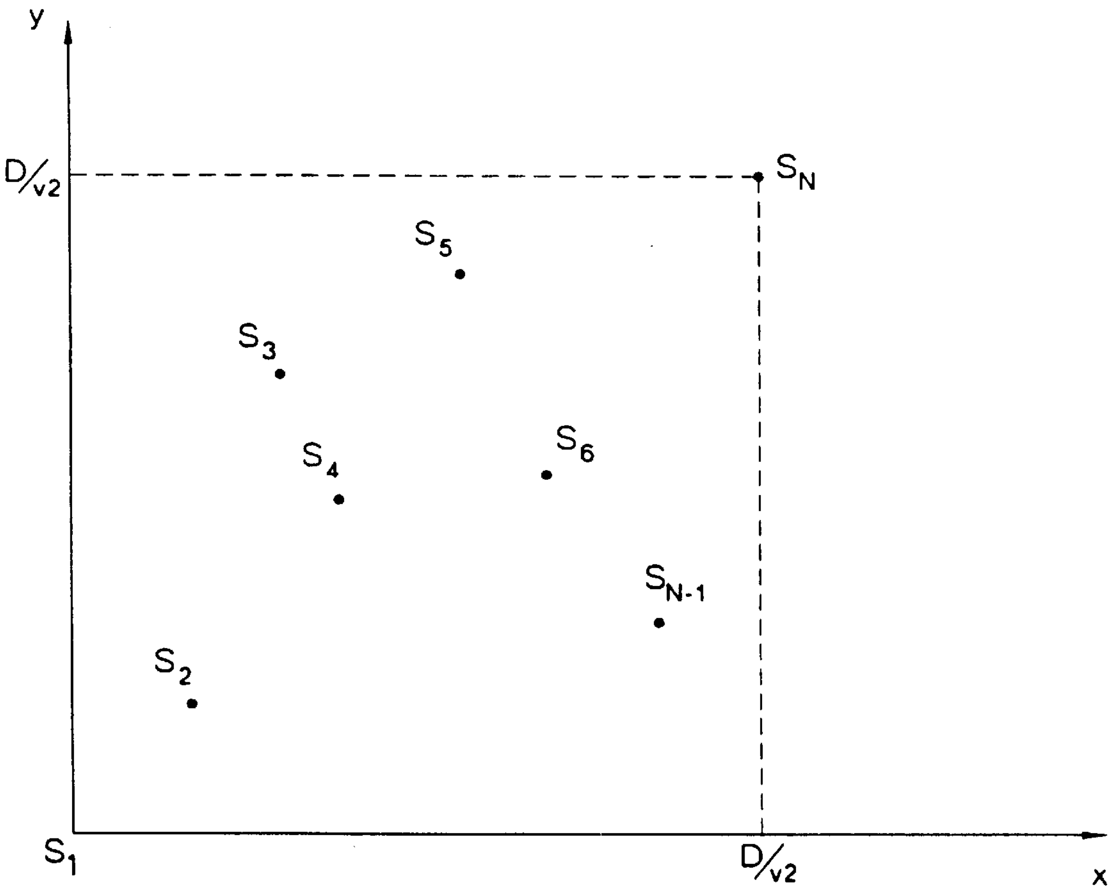
FIG. 4 illustrates a system of axes and a point of origin according to the invention, used to locate the position of sensors.

FIG. 4 illustrates the way in which the point of origin of the reference system is determined. In the example shown, N sensors are to be positioned. The sensor taken as the point of origin of the reference system is arbitrarily denoted as $S_1$ while the sensor that is at the greatest distance from it is denoted as $S_N$. These two sensors $S_1$,$S_N$ are the two sensors most distant from each other among all the N sensors. The distance between these two sensors is denoted by D. A system of axes x,y that are for example orthogonal is created with the first sensor $S_1$ as the point of origin. In the system thus created, the coordinates of the $N^{th}$ sensor $S_N$ are represented by the pair (D/√2, D/√2), provided, in particular, that the axes x,y are orthogonal. In this case, it is assumed that all the other sensors $S_2, S_3, S_4, S_5, S_6 \ldots S_{N-1}$ are located in a square with a side D/√2. The method also applies on a general basis.

The distance D is determined in particular as a function of the so-called 3 dB angle desired for the antenna pattern. This angle $\theta_{3\ dB}$ expresses the width of the reception pattern of an antenna and corresponds to an angle centered on the axis of the pattern in which half of the received power is collected. It is given by the following relationship:

$$\theta_{3\ dB}=\lambda/D \tag{1}$$

Of the two sensors that are at the greatest distance from each other, namely $S_1$, $S_N$, the one selected as a point of origin is, for example, such that in combination with the system of axes x,y, the X-axis coordinates are positive, in which case the Y-axis coordinates are also positive;

In a second step 32 of the method according to the invention, the sensors $S_1, S_2 \ldots S_N$ are, for example, encoded so as to obtain a genotype representing all these sensors. This genotype is especially a function of the coordinates of the sensors in the system $S_{1,x,y}$.

In a second sub-step of this second step 32, the order of the sensors is arranged, for example, along the X-axis. The order of a sensor is located by its index I and the position of a sensor $S_i$ is determined by its coordinates $(x_1,y_i)$, the order of the sensors being such that it verifies the following relationship:

$$x_{i+1}-x_i>0 \tag{2}$$

It is assumed that two sensors never have precisely the same X-axis position. The X-axis coordinate $x_{i+1}$ of the i+1 order sensor $S_{i+1}$ is thus strictly higher than the X-axis coordinate $x_i$ of the i order sensor $S_i$. The positions of the sensors $S_1, S_2, S_3, S_4, S_5, S_6 \ldots S_{N-1}, S_N$ in FIG. 4, illustrate this relationship of order.

The encoding carried out in the second step 32 is for example defined by a set of two vectors obtained starting from the coordinates of the sensors $S_1$ $S_2, \ldots S_N$ in the system $S_{1,x,y}$. These two vectors represent the genotype of the set of N sensors.

A first vector $V_\Delta$ is for example made up of components $\Delta_i$ defined by the following relationship, for the $i^{th}$ order component:

$$\Delta_i = \frac{X_{i+1} - X_i}{D} \tag{3}$$

where:

$X_{i+1}$ and $X_i$ are respectively the X-axis coordinates of the i+1 and i order sensors $S_{i+1}$ and $S_i$.

D is the above-mentioned distance between the two sensors $S_1$, $S_N$ at the greatest distance from each other.

If the order of the sensors is arranged, for example, according to the preceding relationship (2), the components $\Delta_i$ of the first vector $V_\Delta$ are always positive.

Furthermore, the index i of the components $\Delta_i$ varies from 0 to N−1, the first component $\Delta_0$ being equal to 0. This component $\Delta_0$ is actually equal to the X-axis value of the first sensor $S_1$. Since this first sensor $S_1$ is taken as the point of origin, this component $\Delta_0$ is null.

A second vector $V_d$ is for example constituted by components $d_i$ defined by the following relationship for the i order component:

$$d_i = \frac{Y_{i+1} - Y_i}{D} \tag{4}$$

where:

$y_{i+1}$ and $y_i$ are respectively the Y-axis coordinates of the i+1 order sensor $S_{i+1}$ and the $i^{th}$ order sensor $S_i$.

D is the above-mentioned distance.

The index of the components $d_i$ varies from 0 to N−1, the first component, $d_0$ being equal to 0 and being the Y-axis coordinate of the first sensor $S_1$.

The two preceding vectors $V_\Delta$,$V_d$ correspond, by their encoding, to a configuration of the array of sensors $S_1$, $S_2 \ldots S_N$.

The component $d_0$ can be taken away from the second vector $V_d$, just as it is also possible to take away the $\Delta_O$ component away from the first vector $V_\Delta$, no processing being applied thereafter to these components.

In a third step 33, a genetic algorithm is applied to the two vectors previously defined to obtain a given antenna pattern. These two vectors form a genotype of an array configuration. The antenna pattern defines a set of parameters or constraints that correspond, with respect to a genetic algorithm, to a phenotype. Therefore, from a given phenotype, a genetic algorithm determines a genotype giving this phenotype. Several types of genetic algorithms known to those skilled in the art can be applied to the two vectors $V_{66}$ $V_d$ representing the genotype to be determined.

A genetic algorithm comprises a genetic operator. A genetic operator has, in particular, the function of combining two individuals to create a third one. According to the invention, this operator may, for example, have the characteristics defined hereinafter. An individual is represented by its genotype. Hence, in the case of the array of N sensors, an individual corresponds to the set of two preceding vectors $V_{66}$ $V_d$. The genetic operator combines the parameters of the i order sensor of a first individual with the parameters of the i order sensor of the second individual only if the component $d_i$ of the sensor of the first individual is close to the component $d_i$ of the sensor of the second individual. The component $d_i$ and the i order component of the second vector $V_d$ of the vectors constitute the genotype of an individual, i.e. the genotype of a sensor array configuration. The parameters associated with an i order sensor are the i order components $s_i$ and $d_i$ respectively of the first vector $V_\Delta$and the second vector $V_d$. The first sensor $S_1$ and the Nth sensor $S_N$, which constitute the set of sensors at the greatest distance from each other, are excluded from the processing. Besides it must be noted that the encoding carried out according to second step 32 of the method of the invention does not allot components ΔN, dN to the Nth sensor.

To find out if two components $d_i$ are close to each other, it is possible, for example to use a law of probability with a threshold to define the fact that two components are close to each other.

A genetic operator acting as described here above has the advantage, in particular, of creating recombinations that are effective insofar as two array configurations close to each other generate a third close configuration.

After a satisfactory genotype has been obtained, i.e. after a sensor array configuration giving the desired antenna pattern has been obtained, a decoding operation is carried out to obtain the coordinates of the sensors from the two genotype vectors $V_\Delta$,$V_d$.

The X-axis coordinates of an i order vector $S_i$ are defined by the following relationship:

$$x_i = x_{i+1} + D\Delta_i \quad (5)$$

according to the relationship (3), where

N is the total number of sensors. Starting from the N−1 order sensor, the X-axis coordinate of the N−1 order sensor is obtained according to:

$$X_{N-1} = XN + D\Delta_i,$$

where $X_N$ is known and equal for example to $$\frac{D}{\upsilon_2}$$

equal to the X-axis value of the Nth sensor, D being the distance between this sensor and the first sensor $S_1$, and $S_i$ is known, since it is defined by the genetic algorithm.

The coordinates $X_{N-2}$, $X_{N-3}$, . . . $X_2$ of the lower-order sensors are obtained similarly, starting from the highest-order sensor and going towards the second order sensor.

The Y-axis coordinates of an i order sensor are obtained similarly by the following relationship:

$$y_i = y_{i+1} + Dd_i \quad (6)$$

according to the relationship (4) and starting from the N−1 order sensor which gives:

$$y_{N-1} = y_N + Dd_i$$

towards the descending-order sensors up to the second order.

Advantageously, the computing times are reduced by the encoding of the present invention which is minimal; insofar as the number of encoding parameters defining the two genotype vectors $V_\Delta V_d$ is the smallest possible. The computing time is further reduced by the fact that the encoding is not redundant. The genetic algorithm used, whatever it is, therefore does not waste time over space that has already been searched through. Finally, this encoding is well suited to the positioning of the sensors of an antenna array, inasmuch as it is invariant with regard to certain simple operations such as a translation or a rotation. Here too, this property makes it possible to save computing time since all the array configurations that differ only by one translation and/or a rotation can be processed by the algorithm as the same configuration.

The invention is also economical since (1), it requires smaller computing capacities and less computing time and (2) it can be adapted to use existing genetic algorithms without requiring major specific development.

The invention has been described for application to an array of electromagnetic sensors, i.e. especially to obtain a given reception pattern. It can nevertheless be applied in the same way to an array of elementary transmitters in order to obtain a given transmission pattern.

The array of sensors or transmitters can be of various types. In particular, it may be linear or plane, laid out on a plane surface or any unspecified surface, for example a spherical surface.

What is claimed is:

1. A method for positioning plural electromagnetic sensors in an array, the method comprising the steps of:

(1) designating one of the plural sensors as a reference sensor relative to a reference system, wherein the reference sensor is one of two of the plural sensors that are a greatest distance apart from each other;

(2) calculating a first vector of components according to:

$$\Delta_i = \frac{X_{i+1} - X_i}{D};$$

(3) calculating a second vector of components:

$$d_i = \frac{Y_{i+1} - Y_i}{D},$$

where i is the index associated with an i order sensor;

$X_i$, $Y_i$ are coordinates of the i order sensor along an X-axis and a Y-axis, respectively, of the reference system;

$X_{i+1}$, $Y_{i+1}$ are coordinates of an i+1 order sensor along the X-axis and the Y-axis, respectively, of the reference system;

D is a distance between the two sensors of the plural sensors that are the greatest distance apart;

(4) applying a genetic algorithm to the first and second vectors, $\Delta_i$ and $d_i$, respectively, to obtain x and y positions of the plural sensors in the array (5) positioning plural electromagnetic sensors in the array in accordance with the genetically encoded x and y positions pattern of the plural sensors.

2. A method according to claim 1, further comprising the step of arranging plural sensors so that X-axis coordinates of the plural sensors satisfy:

$$X_{i+1}-X_i>0$$

where:

$X_i$ represents the X-axis coordinate of the i order sensor, and $X_{i+1}$ represents the X-axis coordinate of the i+1 order sensor.

3. A method according to claim 1, wherein the reference system is orthogonal.

4. A method according to claim 1, wherein the step of designating the sensor comprises selecting the reference sensor such that the X-axis coordinates of the plural sensors are positive.

5. A method according to claim 1, wherein the step (4) of applying comprises combining first parameters of the i order sensor of a first array configuration with second parameters of the i order sensor of a second configuration only if the first and second components along the second vector are close, wherein the parameters of an i order sensor are the i order components of the first and second vectors.

6. A method according to claim 1, wherein the array is linear.

7. A method according to claim 1, wherein the array is planar.

8. A method for positioning plural electromagnetic transmitters in an array, the method comprising the steps of:

(1) designating one of the plural transmitters as a reference sensor relative to a reference system, wherein the reference sensor is one of two of the plural transmitters that are a greatest distance apart from each other;

(2) calculating a first vector of components according to:

$$\Delta_i = \frac{X_{i+1} - X_i}{D},$$

(3) calculating a second vector of components:

$$d_i = \frac{Y_{i+1} - Y_i}{D};$$

where i is the index associated with an i order sensor;

$X_i$, $Y_i$ are coordinates of the i order sensor along an X-axis and a Y-axis, respectively, of the reference system;

$X_{i+1}$, $Y_{i+1}$ are coordinates of an i+1 order sensor along the X-axis and the Y-axis, respectively, of the reference system;

D is a distance between the two transmitters of the plural transmitters that are the greatest distance apart;

(4) applying a genetic algorithm to the first and second vectors, $\Delta_i$ and $d_i$, respectively, to obtain x and y positions of the plural transmitters in the array (5) positioning plural electromagnetic sensors in the array in accordance with the genetically encoded x and y positions pattern of the plural sensors.

9. A method according to claim 8, further comprising the step of arranging plural transmitters so that X-axis coordinates of the plural transmitters satisfy:

$$X_{i+1}-X_i>0$$

where:

$X_i$ represents the X-axis coordinate of the i order transmitter, and $X_{i+1}$ represents the X-axis coordinate of the i+1 order transmitter.

10. A method according to claim 8, wherein the reference system is orthogonal.

11. A method according to claim 8, wherein the step of designating the transmitter comprises selecting the reference transmitter such that the X-axis coordinates of the plural transmitters are positive.

12. A method according to claim 8, wherein the step (4) of applying comprises combining first parameters of the i order transmitter of a first array configuration with second parameters of the i order transmitter of a second configuration only if the first and second components along the second vector are close, wherein the parameters of an i order transmitter are the i order components of the first and second vectors.

13. A method according to claim 8, wherein the array is linear.

14. A method according to claim 8, wherein the array is planar.

* * * * *